(12) United States Patent
Takagi

(10) Patent No.: US 7,717,138 B2
(45) Date of Patent: May 18, 2010

(54) COMPOSITE HOSE WITH CORRUGATED METAL TUBE

(75) Inventor: Yuji Takagi, Komaki (JP)

(73) Assignee: Tokai Rubber Industries, Ltd. (JP)

( * ) Notice: Subject to any disclaimer, the term of this patent is extended or adjusted under 35 U.S.C. 154(b) by 609 days.

(21) Appl. No.: 11/690,877

(22) Filed: Mar. 26, 2007

(65) Prior Publication Data
US 2007/0221281 A1    Sep. 27, 2007

(30) Foreign Application Priority Data

Mar. 25, 2006  (JP)  .............................. 2006-084330
Mar. 25, 2006  (JP)  .............................. 2006-084331

(51) Int. Cl.
   *F16L 11/00*   (2006.01)
(52) U.S. Cl. ........................ 138/121; 138/109; 138/139; 138/137; 285/256; 285/242
(58) Field of Classification Search ................. 138/121, 138/122, 109, 173, 143, 139; 285/256, 258, 285/259, 903, 222.4, 222.5, 382
See application file for complete search history.

(56) References Cited

U.S. PATENT DOCUMENTS

| | | | |
|---|---|---|---|
| 3,951,438 A * | 4/1976 | Scales ........................... | 285/55 |
| 7,069,954 B2 * | 7/2006 | Takagi et al. ................. | 138/121 |
| 7,086,419 B2 * | 8/2006 | Takagi et al. ................. | 138/121 |
| 7,104,285 B2 * | 9/2006 | Furuta .......................... | 138/121 |
| 7,114,526 B2 * | 10/2006 | Takagi et al. ................. | 138/127 |
| 2004/0020545 A1 * | 2/2004 | Takagi et al. ................. | 138/109 |
| 2004/0227343 A1 | 11/2004 | Takagi et al. | |

FOREIGN PATENT DOCUMENTS

| | | |
|---|---|---|
| DE | 10332130 | 6/2004 |
| DE | 13032130 | 6/2004 |
| JP | 2004-052811 | 2/2004 |
| JP | 2004-190702 | 7/2004 |
| JP | 2004-190704 | 7/2004 |

* cited by examiner

*Primary Examiner*—Patrick F Brinson
(74) *Attorney, Agent, or Firm*—Andrus, Sceales, Starke & Sawall, LLP

(57) ABSTRACT

A composite hose with a corrugated metal tube has a hose body having a corrugated metal tube and an outer layer. The corrugated metal tube includes a non-corrugated straight-walled portion on an end portion thereof, and a rigid insert pipe is inserted in the straight-walled portion. A socket fitting is fitted on the hose body by being swaged thereon radially inwardly, and an inner circumferential end portion of the collar portion and an outer circumferential surface of the insert pipe compress an extending portion of the straight-walled portion to fix the straight-walled portion onto the insert pipe and provide a seal between the outer circumferential surface of the insert pipe and an inner circumferential surface of the straight-walled portion. A fracture preventing mechanism is provided on a hose end portion for preventing fracture of the straight-walled portion.

7 Claims, 14 Drawing Sheets

PRIOR ART

PRIOR ART

PRIOR ART

PRIOR ART

PRIOR ART

PRIOR ART

COMPOSITE HOSE WITH CORRUGATED METAL TUBE

BACKGROUND OF THE INVENTION

1. Field of the Invention

The present invention relates to a composite hose with a corrugated metal tube, which is suitable for a fuel transporting hose for a motor vehicle or a hose transporting fluid such as refrigerant, and more particularly to a composite hose with a corrugated metal tube having a specific fastening structure on an end portion thereof.

2. Description of the Related Art

Typical rubber hoses, for example, made of blended product of acrylonitrile-butadiene rubber and polyvinyl chloride (NBR/PVC blend) that is excellent in a gasoline permeation resistance, have been used for conveying fuel for automobiles or the like in view of their high vibration-absorbability, easiness of assembly or the like. However, for the purpose of global environment protection, the regulations have been recently tighten against permeation of a fuel for motor vehicles or the like, and are anticipated to be further tightened in the future. Further, on the other hand, hoses are demanded to meet the requirements to convey highly permeable fluid such as hydrogen gas used in fuel cells or carbon dioxide ($CO_2$) refrigerant. Then it is anticipated difficult to satisfy the future requirements with hoses made only of organic materials such as rubber or resin.

Accordingly, it is currently considered to adapt a hose with a corrugated metal tube that defines an inner layer for which extremely high fluid impermeability is expected for future application of a fluid impermeable hose.

In case of the composite hose with the corrugated metal tube, even when adapted for hydrogen gas of small molecular mass used for fuel cells, a corrugated metal tube as the inner layer reduces gas permeation zero, i.e., completely eliminates permeation of gas.

However, as an inner layer, i.e., a corrugated metal tube in the hose with the corrugated metal tube is difficult to deform, if the hose with corrugated metal tube is adapted, it will be a problem how to construct fastening structure on an end portion of the hose with the corrugated metal tube so as to assure sealing property thereon.

Conventionally, as shown in FIG. 7, fastening structure for an end portion of typical rubber hose is constructed in a following manner. First, a rigid metal inert pipe 202 is inserted in a hose body 200, a socket fitting 204 including a radially inwardly directed collar portion 206 is fitted on the hose body 200. And then, the socket fitting 204 is swaged radially inwardly onto the hose body 200. The hose body 200, the insert pipe 202 and the socket fitting 204 are securely fastened in unitary relation with one another by swaging the socket fitting 204 radially inwardly onto the hose body 200 and a seal is thereby provided between an inner surface of the hose body 200 and the insert pipe 202.

However, in the composite hose with the corrugated metal tube, it is hard to bring about a sufficient bonding strength between the corrugated metal tube and the insert pipe. When a seal is provided only by fitting relation between the inner circumferential surface of the corrugated metal tube and the outer circumferential surface of the insert pipe, it is difficult to ensure sufficient sealing property therebetween.

In order to solve this problem, the inventor (the applicant) devised a following composite hose with a corrugated metal tube. In this composite hose, a hose body is constructed by laminating an outer layer including an elastic layer on an outer side of a corrugated metal tube as an inner layer. The corrugated metal tube has a non-corrugated straight-walled portion of a straight tubular shape extending straight in an axial direction on an end portion thereof, and an end part of the straight-walled portion extends axially outward from the outer layer to define an extending portion. And, a rigid insert pipe is inserted in the straight-walled portion in the hose body, and a sleeve-shaped socket fitting is fitted on the hose body and swaged thereon radially inwardly. The socket fitting includes a radially inwardly directed collar portion, and an annular fit-in groove is formed in an outer circumferential surface of the insert pipe. The socket fitting is swaged on the hose body in a manner such that an inner circumferential end or an inner circumferential end portion of the collar portion of the socket fitting is fitted in and engaged with the fit-in groove with plastic deformation while force-fitting the extending portion into the fit-in groove. And, the collar portion or a fit-in portion of the collar portion and the fit-in groove sandwich and compress a force-fitted portion of the straight-walled portion therebetween to provide a seal between the straight-walled portion and the insert pipe and fix the straight-walled portion to the insert pipe. This composite hose with the corrugated metal tube is disclosed in the previous patent application (Patent Document 1 below).

FIG. 8 shows concretely the composite hose according to this patent application.

In the Figure, reference numeral 200 indicates a hose body that has a multilayer construction. The hose body 200 comprises an innermost layer constructed by a corrugated metal tube 204, and an outer layer laminated on an outer side of the corrugated metal tube 204 and constructed by an inner elastic layer 206, a reinforcing layer 208 and an outer elastic layer 210, and these layers are securely bonded each other in unitary relation.

The corrugated metal tube 204 has a corrugated portion 212 generally along an entire length thereof, and is provided with flexibility by the corrugated portion 212.

The corrugated metal tube 204 has a non-corrugated straight-walled portion 214 of a straight tubular shape on an end portion thereof, and the straight-walled portion 214 extends straight continuously from the corrugated portion 212 in an axial direction.

Here, an end part of the straight-walled portion 214 extends axially outwardly so as to be exposed out of the outer layer to define an extending portion that is indicated at reference numeral 216 in the Figure.

Reference numeral 222 indicates a rigid insert pipe (made of a metal here) and reference numeral 218 indicates a sleeve-shaped socket fitting. The socket fitting 218 has a radially inwardly directed collar portion 220 on an axial end portion thereof.

Here, an inner diameter of the above straight-walled portion 214 is set equal to an outer diameter of the insert pipe 222 in view of facilitating assembly of the hose body 200 and the insert pipe 222.

FIG. 8 (A) shows a state before the socket fitting 218 is swaged on the hose body 200.

As shown in the Figure, in this composite hose with the corrugated metal tube, the insert pipe 222 is inserted in the straight-walled portion 214 of the corrugated metal tube 204, the socket fitting 218 is fitted on the hose body 200, the socket fitting 218 is swaged onto the hose body 200 radially inwardly to fasten an end portion of the hose body 200, the insert pipe 222 and the socket fitting 218 together in unitary relation.

By swaging the socket fitting 218 onto the hose body 200, as shown in FIG. 8 (B), the extending portion 216 of the straight-walled portion 214 is sandwiched and compressed by and between an inner circumferential end of the collar portion 220 and an outer circumferential surface of the insert pipe 222 to perform two functions at a time, namely to fix the straight-walled portion 214 to the insert pipe 222 and to provide a seal therebetween.

In particular, in this prior art example, an annular fit-in groove 213 is formed in the outer circumferential surface of the insert pipe 222 corresponding to the collar portion 220, when the socket fitting 218 is swaged onto the hose body 200, an inner circumferential end portion of the collar portion 220 is fitted in the fit-in groove 213 while being plastically deformed by the fit-in groove 213 to define a fit-in portion 221 (refer to a fragmentary enlarged view of FIG. 8B) of a shape following a contour of the fit-in groove 213. The fit-in portion 221 and the fit-in groove 213 are fitted each other via the extending portion 216 that is deformed so as to enter in the fit-in groove 213, thereby fixing the straight-walled portion 214 to the inert pipe 222 and providing a seal between the insert pipe 222 and the straight-walled portion 214.

Meanwhile, as shown in FIG. 8B, here, the socket fitting 218 is swaged at a plurality of swaged positions in an axial direction thereof. Specifically, the socket fitting 218 is swaged radially inwardly at each of a plurality of swaged positions, $P_1$, $P_2$, $P_3$ and $P_4$ in the axial direction thereof.

However, later on, a problem is found that a durability or durable life of the straight-walled portion 214 is not sufficient in the composite hose with the corrugated metal tube.

Specifically, a durability test was conducted with the composite hose with the corrugated metal tube by exerting an internal pressure to the composite hose repeatedly, and the problem is found that an axial fracture or axial crack was caused on a part of the straight-walled portion 214.

Then, the inventor studied the cause of the fracture and found out the fact as follows.

In the composite hose with the corrugated metal tube, the collar portion 220 of the socket fitting 218 and the outer circumferential surface of the insert pipe 222 sandwich and compress the extending portion 216 therebetween to provide a seal therebetween. However, on a portion of the straight-walled portion 214 extending to the right with respect to the collar portion 220 in the Figure, the bonding strength is small, for example, a clearance (gap) is created between the inner circumferential surface of the straight walled portion 214 and the outer circumferential surface of the insert pipe 222. Due to that, when an inner pressure is exerted to the composite hose with the corrugated metal tube, an internal fluid enters between the inner circumferential surface of the straight-walled portion 214 and the outer circumferential surface of the insert pipe 222, and the internal pressure is exerted also to the straight-walled portion 214 repeatedly. As a result, a region of the straight-walled portion 214 is expansively and contractively deformed in a radial direction repeatedly. Then, the inventor reached the conclusion that this repeated expansive and contractive deformation caused a metal fatigue in this region of the straight-walled portion 214, and an axial fracture was caused in the deformed region of the straight-walled portion 214.

And, at the same time, it was found that an axial fracture is liable to occur in a region between one and adjacent swaged portions of the socket fitting 218.

The cause of this fracture or phenomenon may be estimated as follows.

When the socket fitting 218 is swaged at positions of $P_1$, $P_2$, $P_3$ and $P_4$, the outer elastic layer 210 is deformed so as to escape or enter into a recessed portion 224 between the swaged positions inside the socket fitting 218, namely a large volume displacement was caused.

At that time, the straight-walled portion 214 is also pushed in an axial direction due to movement of the reinforcing layer 208 and the inner elastic layer 206 accompanying movement of the outer elastic layer 210, and a region between the swaged positions in the straight-walled portion 214 is expansively deformed radially outwardly so as to have a wave pattern as shown in FIG. 9.

This region with the wave pattern is vulnerable to a load or pressure from the internal fluid. As a result, the region is more expansively and contractively deformed repeatedly due to repeated cycling of the pressure from the internal fluid. Then, it is estimated that large local distortion and elongation is caused in the region, and finally, a fracture or crack propagates through the region in the axial direction due to metal fatigue.

In a fragmentary enlarged view of FIG. 8(A), reference numeral 213a indicated a bottom surface of the fit-in groove 213, and reference numeral 213b indicates a side wall of the fit-in groove 213 on a front side thereof, and reference numeral 213c indicates a side wall of the fit-in groove 213 on a rear side thereof.

The extending portion 216 is partly force-fitted in the fit-in groove 213 by being plastically deformed to define the force-fitted portion 226. The force-fitted portion 226 is sandwiched and firmly compressed between the bottom surface 213a and a pair of the side walls 213b, 213c of the fit-in groove 213, and the inner circumferential end surface, the axial outer surface on the front side and the axial inner surface on the rear side of the fit-in portion 221, which correspond to the bottom surface 213a and a pair of the side walls 213b, 213c of the fit-in groove 213, respectively. And, thereby the force-fitted portion 226 is fixed to the insert pipe 222.

By the way, in the composite hose with the corrugated metal tube, when the socket fitting 218 is swaged, the extending portion 216 of the straight-walled portion 214 is deformed while being elongated. Also, when a high internal pressure is exerted to an inside of the hose, the reinforcing layer 208 is pulled in the axial direction, a strong pull force acts axially on the straight-walled portion 214 in a part at a position of an opening corner portion 228 of the side wall 213c on the rear side shown in the fragmentary enlarged view of FIG. 10, and the straight-walled portion 214 is distorted and elongated largely locally at the part thereof.

And, when an elongated length resulted from distortion and elongation exceeds an elongation at fracture, the straight-walled portion 214 has a fracture in the part at the position of the corner portion 228. That problem is found later on.

Patent Documents 2 and 3 as well as Patent Document 1 disclose a technique such that a collar portion of a socket fitting and an outer circumferential surface of an insert pipe sandwich and compress a straight-walled portion of a corrugated metal tube, specifically an extending portion of the straight-walled portion therebetween radially to fix the straight-walled portion to the insert pipe and provide a seal between the straight-walled portion and the insert pipe.

[Patent Document 1] JP-A, 2004-52811
[Patent Document 2] JP-A, 2004-190702
[Patent Document 3] JP-A, 2004-190704

Under the circumstances stated above, it is an object of the present invention to provide a composite hose with a corrugated metal tube that can be restrained from fracture. According to one aspect of the present invention, it is an object to provide a composite hose with a corrugated metal tube that can be restrained from fatigue fracture and having an enhanced durable life. And, according to another aspect of the present invention, it is an object to provide a composite hose with a corrugated metal tube of which straight-walled portion can be favorably restrained from fracture at an opening corner portion of a fit-in groove, during swaging operation, or by strong pull-force exerted to a hose body when an internal pressure is exerted to the hose body.

SUMMARY OF THE INVENTION

In order to achieve a foregoing object, there is provided a novel composite hose with a corrugated metal tube.

According to the present invention, the composite hose with the corrugated metal tube comprises a hose body having a corrugated metal tube as an inner layer and an outer layer including an elastic layer laminated on an outer side of the corrugated metal tube. The corrugated metal tube includes a non-corrugated straight-walled portion extending straight in an axial direction thereof on an end portion thereof, and an end part of the straight-walled portion extends axially outward from the outer layer to define an extending portion. The composite hose with the corrugated metal tube further comprises a rigid insert pipe inserted in the straight-walled portion, and a socket fitting of a sleeve shape fitted on the hose body by being swaged thereon radially inwardly. The socket fitting includes a radially inwardly directed collar portion. The extending portion of the straight-walled portion is compressed or compressively sandwiched between an inner circumferential end or an inner circumferential end portion of the collar portion and an outer circumferential surface of the insert pipe to fix the straight-walled portion onto the insert pipe and provide a seal between the outer circumferential surface of the insert pipe and an inner circumferential surface of the straight-walled portion. A fracture preventing mechanism is provided on a hose end portion or an end portion of the hose for preventing fracture of the straight-walled portion.

According to one aspect of the present invention, the fracture preventing mechanism is constructed in a manner such that an outer diameter of the insert pipe is set larger or greater than an inner diameter of the straight-walled portion before insertion of the insert pipe, for example, by 0.1 mm or more, more preferably by 0.2 mm or more, and the insert pipe is press-fitted in the straight-walled portion by plastically deforming the straight-walled portion in a diametrically expanding direction.

According to one aspect of the present invention, an annular fit-in groove is formed in the outer circumferential surface of the insert pipe, the inner circumferential end or the inner circumferential end portion of the collar portion of the socket fitting is fitted in the fit-in groove by plastically deforming the extending portion and force-fitting the extending portion into the fit-in groove, and the collar portion (fit-in portion) and the fit-in groove compress or compressively sandwich a force-fitted portion of the extending portion of the straight-walled portion therebetween to fix the straight-walled portion onto the insert pipe and to provide a seal between the outer circumferential surface of the insert pipe and the inner circumferential surface of the straight-walled portion.

Here, the fracture preventing mechanism may be constructed in a manner such that a rear side wall (a side wall on a rear side) of the fit-in groove near the hose body or the outer layer is angled away from an axially inner surface of the collar portion (fit-in portion) on a rear side thereof as approaching from a bottom surface of the fit-in groove to an opening thereof. The bottom surface of the fit-in groove and a front side wall (a side wall on a front side) of the fit-in groove opposite to the hose body or the outer layer, and an inner circumferential end surface of the collar portion (fit-in portion) corresponding to the bottom surface of the fit-in groove and an axially outer surface of the collar portion on a front side thereof corresponding to the front side wall of the fit-in groove compress the force-fitted portion therebetween, while the rear side wall of the fit-in groove near the hose body or the outer layer and an axially inner surface of the collar portion (fit-in portion) on a rear side thereof corresponding to the rear side wall of the fit-in groove, does not compress or compressively sandwich the force-fitted portion of the extending portion therebetween.

According to one aspect of the present invention, the socket fitting is swaged at a plurality of swaged positions in an axial direction thereof to define a plurality of stepped portions axially spaced from each other, and a holddown portion is formed on an inner circumferential surface of the socket fitting between adjacent swaging positions so as to project radially inwardly for holding down an outer circumferential surface of the hose body radially inwardly.

However, according to one aspect of the present invention, the socket fitting is swaged so as to be diametrically contracted inwardly continuously through a certain axial length thereof and define a swaged portion of the certain axial length that is contracted radially inwardly.

The rear side wall of the fit-in groove may define a tapered or inclined surface inclined at an angle or taper angle of 60° to 70°, or a tapered or inclined surface angled at 60° to 70°.

A length or taper length of the rear side wall defining the tapered surface may be 1.5 mm to 3.0 mm.

According to the present invention, since the fracture preventing mechanism is constructed on a hose end portion, the straight-walled portion is prevented from fracture and thereby a life or durable life of the composite hose with the corrugated metal tube can be improved effectively.

According to one aspect of the present invention, the fracture preventing mechanism is constructed in the manner such that the outer diameter of the insert pipe is set larger or greater than the inner diameter of the straight-walled portion before insertion of the insert pipe, for example, by 0.1 mm or more, more preferably, 0.2 mm or more, and the insert pipe is press-fitted in the straight-walled portion by plastically deforming the straight-walled portion in the diametrically expanding direction, thereby the insert pipe is assembled in the hose body. Therefore, the inner circumferential surface of the straight-walled portion closely and firmly contact with the outer circumferential surface of the insert pipe, without creating a clearance.

So, even when an inner pressure is exerted to the composite hose with the corrugated metal tube repeatedly, an internal fluid does not enter or penetrate between the inner circumferential surface of the straight-walled portion and the outer circumferential surface of the insert pipe, and it is prevented that the internal pressure is exerted to the straight-walled portion repeatedly due to penetration of the internal fluid.

When the internal pressure is exerted to the composite hose with the corrugated metal tube repeatedly, typically a metal fatigue is caused at a certain region of the straight walled portion, resulting in an axial fracture of the straight-walled portion. However, according to one aspect of the present invention, this phenomenon is favorably prevented and a durable life of the composite hose with the corrugated metal tube is improved.

Usually, manufacturing variations are present in an inner diameter of the straight-walled portion of the corrugated metal tube, and further in an outer diameter of the insert pipe. However, here, a lower limit tolerance of the outer diameter of the insert pipe is set larger or greater than an upper limit tolerance of the inner diameter of the straight-walled portion, for example, by 0.1 mm or more, more preferably 0.2 mm or more.

And, a difference between the outer diameter of the insert pipe and the inner diameter of the straight-walled portion is set preferably equal to or smaller than 0.7 mm in view of a processing accuracy of the inner diameter of the straight-walled portion of the corrugated metal tube, a processing accuracy of the insert pipe, and a strength of the straight-walled portion of the corrugated metal tube.

According to one aspect of the present invention, the fracture preventing mechanism is constructed in a manner such that the rear side wall of the fit-in groove near the hose body or the outer layer is angled axially rearward as approaching from the bottom surface of the fit-in groove to the opening thereof, the bottom surface of the fit-in groove and the front side wall of the fit-in groove opposite to the hose body or the outer layer, and the inner circumferential end surface of the fit-in portion corresponding to the bottom surface of the fit-in groove and the axially outer surface of the fit-in portion on the front side thereof corresponding to the front side wall of the fit-in groove compress or compressively sandwich the force-fitted portion of the extending portion of the straight-walled portion therebetween so as to force-fit the force-fitted portion in the fit-in groove, while the rear side wall of the fit-in groove near the hose body or the outer layer and the axially inner surface of the fit-in portion on the rear side thereof corresponding to the rear side wall of the fit-in groove, does not compress or compressively sandwich the force-fitted portion of the extending portion therebetween. Therefore, according to this aspect of the present invention, it can be restrained that the straight-walled portion is locally elongated so as to be squeezed in a part at a position of an opening corner portion of the fit-in groove, during swaging operation. And, even when a high internal pressure is exerted in the hose body (the composite hose) and an axial pull force acts on the hose body, it can be restrained that a large torsion and a large elongation are caused locally in the above part of the straight-walled portion at the position of the opening corner portion, and it can be favorably prevented that fracture occurs in the part of the straight-walled portion. This arrangement can strengthen a pressure resistance of the composite hose with the corrugated metal tube.

According to one aspect of the present invention, the socket fitting is swaged at a plurality of swaged positions in an axial direction thereof to define a plurality of stepped portions axially spaced from each other. And, the holddown portion is formed on the inner circumferential surface of the socket fitting between adjacent swaged positions so as to project radially inwardly for holding down the outer circumferential surface of the hose body radially inwardly.

Here, thereby it is prevented that the elastic layer of the hose body is deformed so as to escape into an inner recessed portion defined between the adjacent swaged positions of the socket fitting during swaging operation of the socket fitting. That is, the elastic layer is restrained from volume displacement from a portion at a swaged position to a portion between the swaged position and an adjacent swaged position.

As a result, a certain part of the straight-walled portion, specifically a portion between the adjacent swaged positions is restrained from being expansively deformed radially outwardly so as to have a wave pattern.

Therefore, can be restrained a fatigue fracture resulted from that this part swollen and deformed is more expansively deformed or contractively deformed due to repeated cycles of the internal pressure to the part, and the durability of the composite hose with the corrugated metal tube can be further enhanced.

Here, it is effective to provide the above holddown portion when a distance between adjacent swaged positions is equal to or greater than 5 mm.

Or, according to one aspect of the present invention, the socket fitting may be swaged so as to be diametrically contracted inwardly continuously through a certain axial length thereof, instead of being swaged at a plurality of the swaged positions. In this swaging manner, the straight-walled portion of the corrugated metal tube can be restrained from being expansively deformed at a certain part thereof so as to have a wave pattern due to displacement of the elastic layer of the hose body in the axial direction during swaging operation of the socket fitting.

So, the durable life of the composite hose with the corrugated metal tube can be effectively enhanced also in this swaging manner.

According to one aspect of the present invention, the rear side wall of the fit-in groove or the side wall on the rear side of the fit-in groove may define the tapered surface inclined at the taper angle of 60° to 70°.

The taper angle means an angle with respect to a line perpendicular to an axis of the hose body. When the taper angle is smaller than 60°, a load exerted locally to the part at the position of the opening corner portion of the straight-walled portion and an elongation of the part cannot be eased sufficiently. On the other hand, when the taper angle is greater than 70°, the socket fitting is not engaged with the insert pipe sufficiently, the fixing strength of a compressed portion or the force-fitted portion of the extending portion becomes insufficient, and there is a possibility that the sealing property cannot be ensured.

And, a length of the tapered surface defined by the rear side wall of the fit-in groove, namely a taper length of the rear side wall of the fit-in groove may be set in a range of 1.5 mm to 3.0 mm.

When the taper length is smaller than 1.5 mm, a load exerted locally to the part at the position of the opening corner portion of the straight-walled portion and a torsion of the part cannot be eased effectively, since an elongation of a part of the force-fitted portion corresponding to the rear side wall of the fit-in groove cannot be secured sufficiently. And, the outer diameter of the bottom surface of the fit-in groove formed in the insert pipe is decreased as the taper length is increased, when the taper length is greater than 3.0 mm, a sufficient wall-thickness of the insert pipe at the fit-in groove cannot be ensured.

Now, the preferred embodiments of the present invention will be described in detail with reference to the drawings.

BEST MODE FOR CARRYING OUT THE INVENTION

Figure 1A:
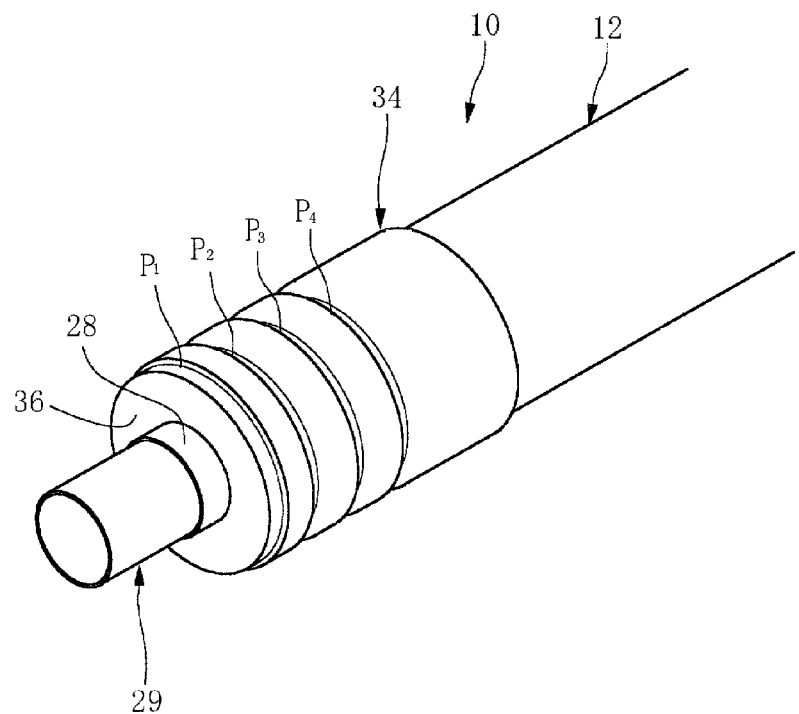
FIG. 1A is a perspective view of a composite hose with a corrugated metal tube according to one embodiment of the present invention.
Figure 1B:
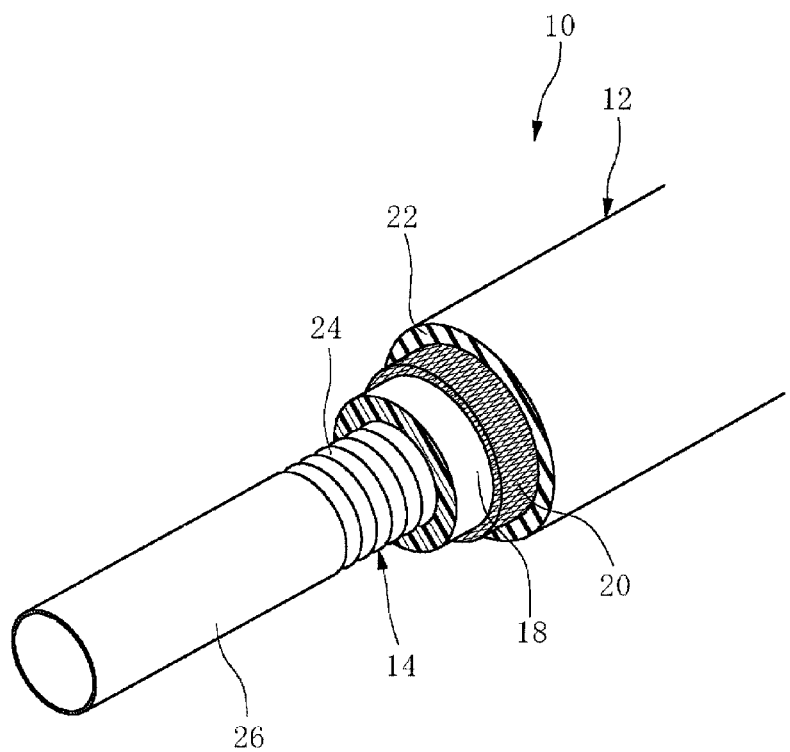
FIG. 1B is a perspective view of the composite hose with the corrugated metal tube of FIG. 1A, showing partly cutaway.
Figure 2:
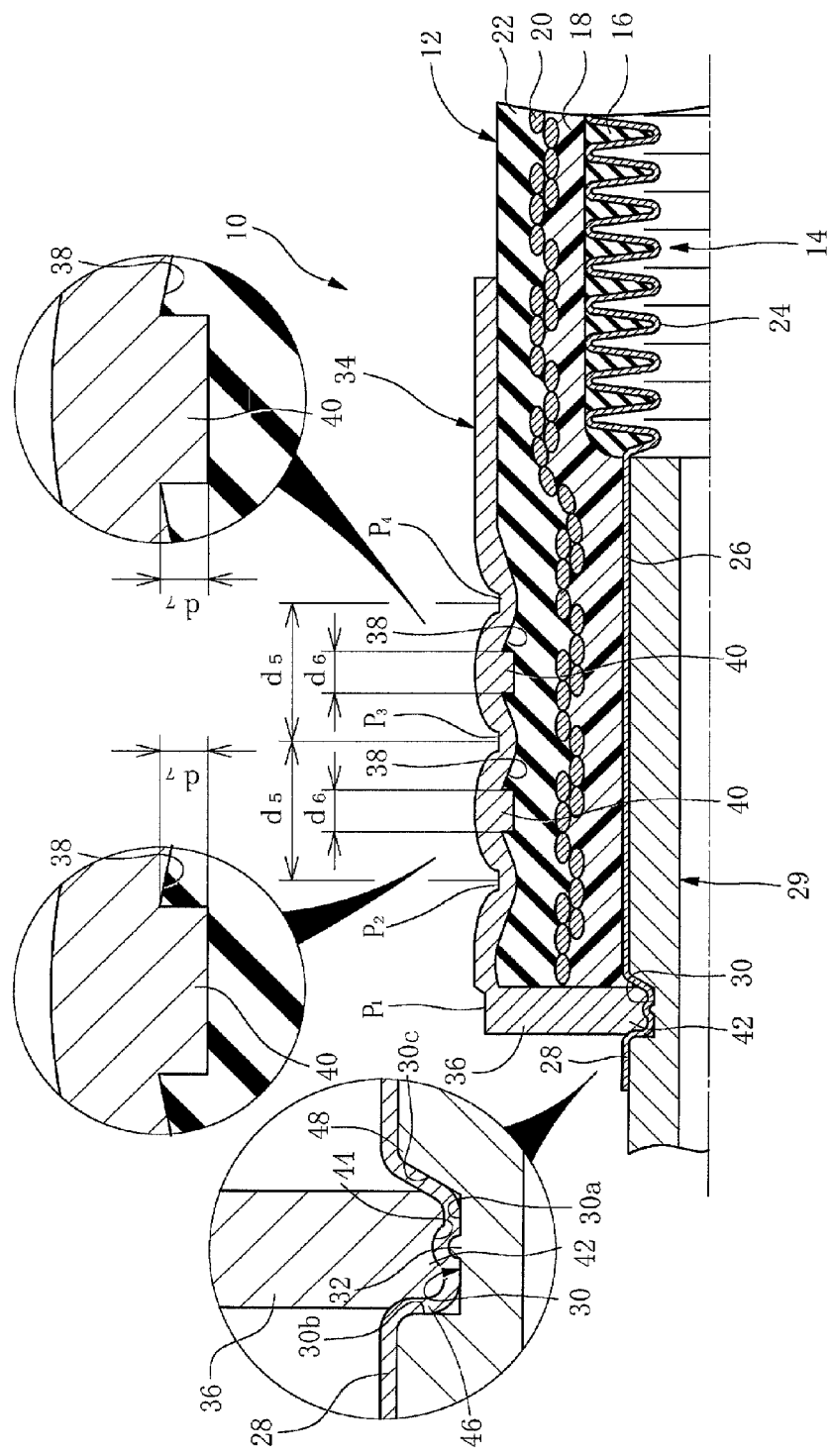
FIG. 2 is an enlarged sectional view of a relevant part of the composite hose with the corrugated metal tube of FIG. 1A.
Figure 3A:
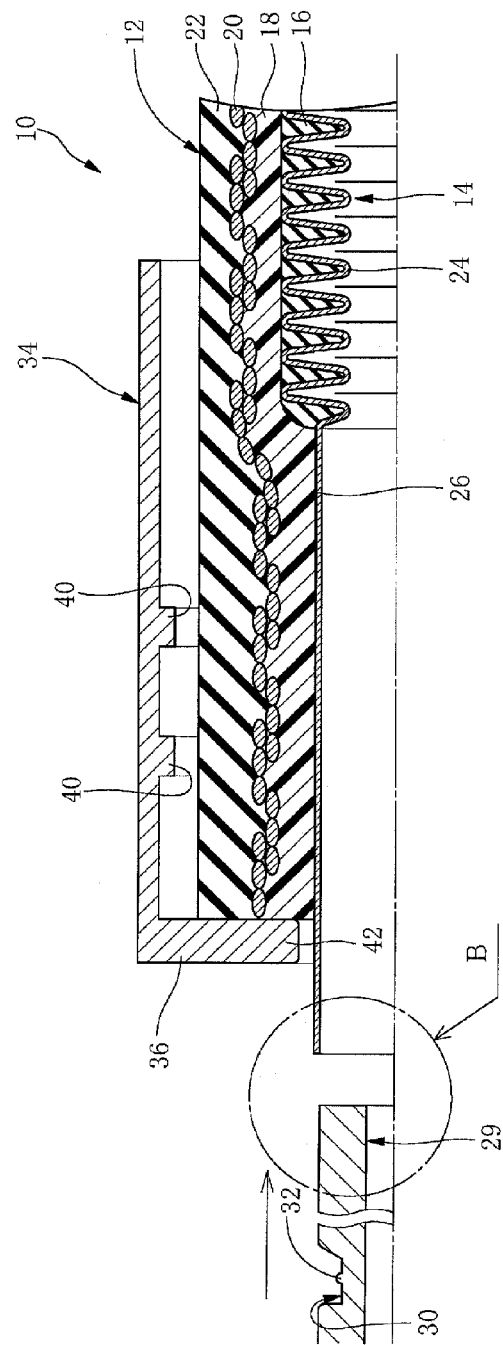
FIG. 3A is a view showing the composite hose with the corrugated metal tube of FIG. 1A before insertion of an insert pipe.
Figure 3B:
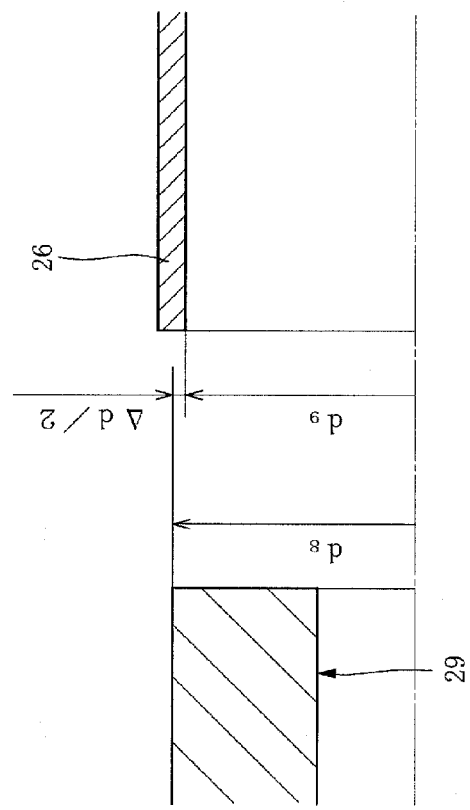
FIG. 3B is an enlarged view of a part B of FIG. 3A.
Figure 3C:
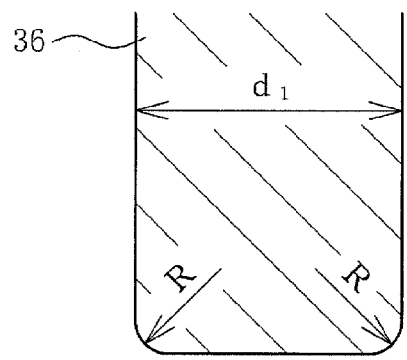
FIG. 3C is an enlarged view of a collar portion of the composite hose with the corrugated metal tube.
Figure 3D:
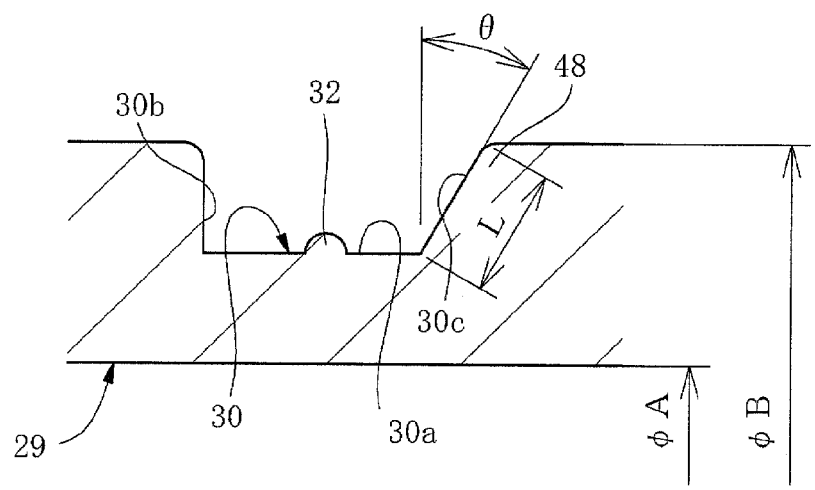
FIG. 3D is an enlarged view of a fit-in groove of the composite hose with the corrugated metal tube.

In FIGS. 1 and 2, reference numeral 10 indicates a composite hose with a corrugated metal tube (hereinafter simply referred to as a hose), and reference numeral 12 indicates a hose body. The hose body 12 includes a corrugated metal tube 14 that defines an innermost layer, and an outer layer on a radially outer side of the corrugated metal tube 14, the outer layer has a rubber filler layer 16 as an elastic filler layer, a hard resin layer 18, a reinforcing layer 20 and an outer rubber layer (covering rubber layer) 22. These layers are laminated on one another and securely bonded to one another in unitary relation.

The corrugated metal tube 14 is formed with a corrugated portion 24 generally through an entire axial length thereof, which provides the corrugated metal tube 14 with flexibility.

The corrugated metal tube 14 has integrally a straight-walled portion 26 of a non-corrugated shape on an end portion thereof, extending straight in an axial direction, continuously from the corrugated portion 24.

The straight-walled portion 26 includes an end part that defines an extending portion extending in the axial direction and is exposed out of the outer layer of the hose body 12. The extending portion is indicated at reference numeral 28 in the Figure.

The corrugated metal tube 14 serves as a barrier layer to a permeation of a conveyed fluid. For the corrugated metal tube 14 defining the innermost layer, stainless steel, iron and steel, aluminum or aluminum alloy, copper or copper alloy, nickel or nickel alloy, titanium or titanium alloy, or the like may be used. The material of the corrugated metal tube 14 may be selected properly from these metals in view of resistance to conveyed fluid, durability against vibration/pressure, easiness of processing into a metal tube (processability into a metal tube), or the like. Specifically, stainless steel is preferably used.

The above corrugated metal tube 14 preferably has a wall thickness equal to or less than 0.5 mm in view of flexibility and pliableness required. On the other hand, in view of easiness of processing into a metal tube, a wall thickness of the corrugated metal tube 14 is preferably equal to or greater than 0.1 mm. In this embodiment, the wall-thickness of the corrugated metal tube 14 is set 0.23 mm.

The rubber filler layer (a layer made of a solid, non-foamed rubber) 16 is a layer which penetrates in a corrugation valley gap between adjacent corrugation hills of the corrugated portion 24 on an outer peripheral side thereof for preventing the corrugated portion 24 from expansive deformation when an internal pressure is exerted to the corrugated portion 24.

In this embodiment, the rubber filler layer 16 is filled completely in the valley gaps to tops of the corrugation hills in such manner that a radial thickness between the tops of the corrugation hills and the hard resin layer 18 or an inner peripheral surface of the hard resin layer 18 is equal to or less than 0.3 mm.

On the other hand, the resin layer or hard resin layer 18 on an inner side of the reinforcing layer 20 encloses or confines the rubber filler layer 16, which is filled in the valley gaps between the corrugation hills on an outer peripheral side of the corrugated portion 24, within the valley gaps and serves to prevent the rubber filler layer 16 from escaping out of the valley gaps radially outwardly when the corrugated metal tube 14 is deformed.

In order to accommodate the functionality needs, the above resin layer 18 preferably has such rigidity as not to allow its deformation due to a stress which is generated by an internal pressure in the hose 10, and a wall thickness required for securing such rigidity. In that sense, the resin layer 18 may preferably have a wall thickness equal to or greater than 0.15 mm.

For the material for the resin layer 18, usable is resin such as an alloy material of polyamide-6 (PA6) and ethylene-propylene diene rubber (EPDM), polyethylene (PE), polypropylene (PP), PA6, polyamide-11 (PA11), polyamide-12 (PA12), polyethylene terephthalate (PET), polybutylene terephthalate (PBT), polybuthylene naphthalate (PBN), polyvinylidene fluoride (PVDF), ethylene-tetrafluoroethylene copolymer (ETFE), polytetrafluoroethylene (PTFE), polyphnylene sulfide (PPS), acrylonitrile-butadiene-styrene copolymer (ABS), polyethylene-vinyl acetate (EVA).

Meanwhile, the reinforcing layer 20 is provided to secure pressure resistance. Here, the reinforcing layer 20 may be a fiber-reinforcing layer or a wire reinforcing layer formed from a metal wire. The reinforcing layer 20 may be formed by braiding a fiber or the metal wire.

The outer rubber layer 22 is provided in view of protecting inner layers (protection against liquid, or shock or the like from outside), and preferably has a wall-thickness of about 0.2 to 2.0 mm.

Materials for the outer rubber layer 22 may be selected suitably in view of bonding property to an adjacent layer, flexibility, resistance to service conditions (liquid or shock from outside) or the like, and easiness of processing, or the like.

For example, the material for the outer rubber layer 22 may be selected properly from natural rubber type, styrene-butadiene rubber type, butadiene rubber type, isoprene rubber type, chloroprene rubber type, butyl rubber type, nitrile rubber type, ethylene-propylene rubber type, acrylic rubber type, urethane rubber type, silicon rubber type, fluorocarbon rubber type, polysulfide rubber type, epichlorohydrin rubber type, propylene oxide rubber type, alfin rubber type, or the like, or Hypalon (trademark of DuPont Dow Elastomers for chlorosulfonated polyethylene rubber) type.

As the case maybe, thermoplastic elastomer may be used for the outer rubber layer 22.

In this embodiment, EPDM is used for the outer rubber layer 22.

In FIG. 2, reference numeral 29 indicated a rigid insert pipe made of metal, and has an outer peripheral surface defining a straight-walled surface in an axial direction.

In the outer peripheral surface of the insert pipe 29, a fit-in groove 30 is formed annularly so as to extend in a circumferential direction thereof.

Figure 4:
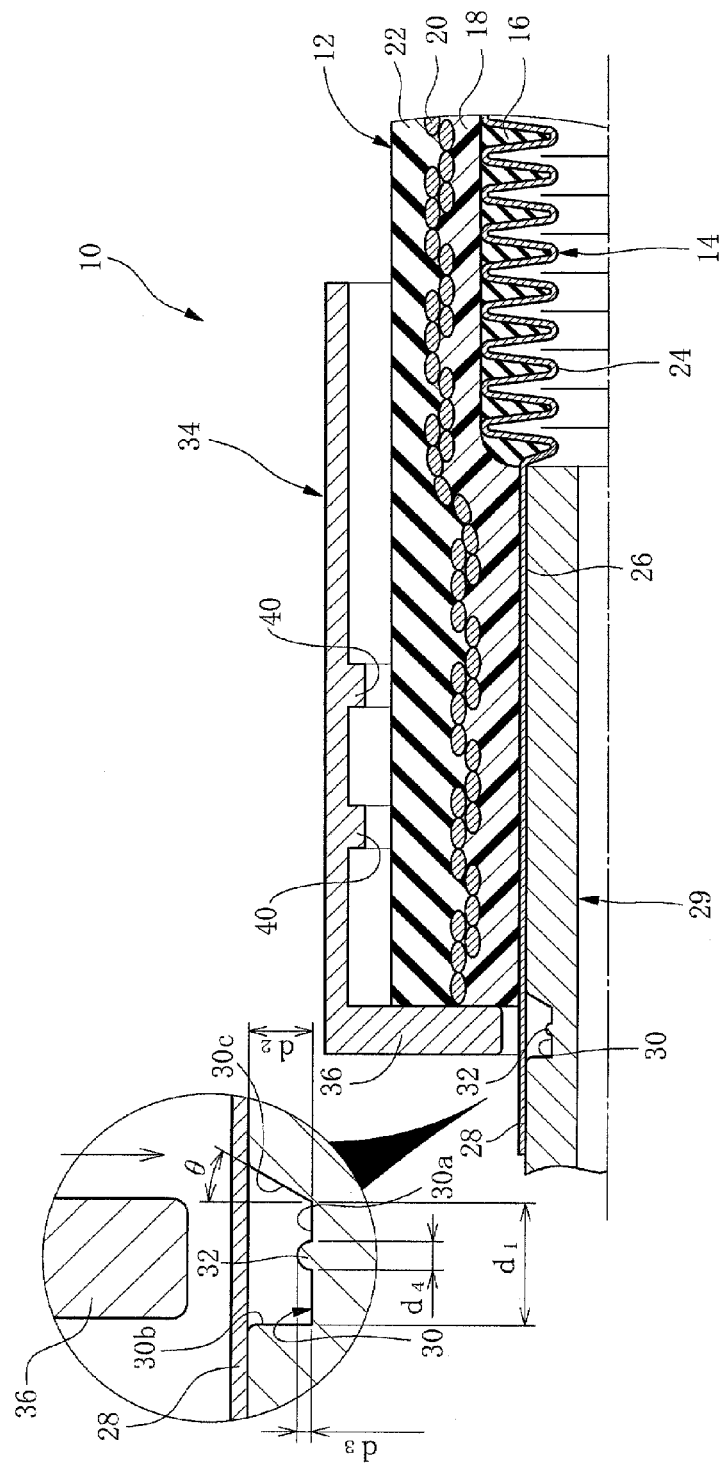
FIG. 4 is a view showing the composite hose with the corrugated metal tube of FIG. 1A before swaging operation of a socket fitting.

As shown in FIGS. 3 and 4, the fit-in groove 30 has a groove bottom surface or wall 30a extending in the axial direction and a groove front side surface or wall 30b (a left side surface in the Figure) extending upright at right angle to the bottom surface 30a.

A rear side surface or wall (a right side surface in the Figure) 30c is angled in a direction axially away from an axially inner surface of a rear side (right side in the Figure) of a collar portion 36 (specifically, an axially inner surface on a rear side of a fit-in portion 42 that will be described later) as approaching from the bottom surface 30a to an opening end of the fit-in groove 30, specifically defines a tapered surface at an angle θ (angle to a direction perpendicular to an axis, angle to a line perpendicular to an axis) or an inclined surface extending radially outwardly angled axially inwardly at an angle θ.

The rear side surface 30c of the fit-in groove 30 defining the tapered surface has a taper length (indicated at reference character L in FIG. 3) of 1.95 mm.

The bottom surface 30a is provided with a bulge portion 32 of generally semicircular cross-section bulging radially outwardly.

In FIG. 4, $d_1$ indicates an axial length of the bottom surface 30a ($d_1$ indicates also a wall thickness of the collar portion 36 as indicated in FIG. 3), $d_2$ indicates a depth of the fit-in groove 30, $d_3$ indicates a bulging height of the bulge portion 32, and $d_4$ indicates an axial length of the bulge portion 32, respectively.

In this embodiment, θ is 60° (in the Figure, the taper angle θ of the rear side surface 30c is illustrated low), $d_1$ is 3.2 mm, $d_2$ is about 1 mm, $d_3$ is 0.2 mm, and $d_4$ is 0.4 mm.

In FIG. 2, reference numeral 34 indicates a sleeve-like socket fitting, which has a radially inwardly directed collar portion 36 on an axial end portion at a front (on the left in the Figure) thereof.

The socket fitting 34 is swaged radially inwardly at a plurality of swaged positions, $P_1$, $P_2$, $P_3$, and $P_4$ in an axial direction thereof. Namely, in this embodiment, the socket fitting 34 is swaged in a manner such that a plurality of stepped portions are defined axially spaced from each other, thereby an end portion of the hose body 12 is compressively sandwiched by the socket fitting 34 and the insert pipe 29 radially, and fastened to the insert pipe 29 and the socket fitting 34 in unitary relation.

In this embodiment, the socket fitting 34 is formed from lower hardness material compared to the insert pipe 29. So, by swaging operation, an inner circumferential end portion of the collar portion 36 is partly plastically deformed by the fit-in groove 30 to form a fit-in portion 42. This fit-in portion 42 enters in the fit-in groove 30 by being plastically deformed.

Specifically, the fit-in portion 42 is fitted to and engaged with the fit-in groove 30 each other via the extending portion 28 of the straight-walled portion 26 that is deformed by swaging operation and fitted in the fit-in groove 30.

And, due to their fitting and engaging relation, a portion of the extending portion 28 force-fitted in the fit-in groove 30 (a force-fitted portion 46) is compressively sandwiched by and between an axially outer surface of the fit-in portion 42 and the front side surface 30b in an axial direction, while being compressively sandwiched by and between an inner circumferential end surface of the fit-in portion 42 and the bottom surface 30a radially.

However, the rear side surface 30c is inclined at an angle θ, and defines a tapered surface angled away from the axially inner surface of the fit-in portion 42 on a rear side thereof as approaching from the bottom surface 30a to the opening of the fit-in groove 30. Consequently, a gap is created between the rear side surface 30c of the fit-in groove 30 and the axially inner surface of the fit-in portion 42 on the rear side thereof, specifically, a portion of the force-fitted portion 46 corresponding to the rear side surface 30c and the axially inner surface of the fit-in portion 42, therefore, the force-fitted portion 46 is not compressively sandwiched in an axial direction by and between the fit-in portion 42 and the rear side surface 30c. The portion of the force-fitted portion 46 corresponding to the rear side surface 30c is free from restraint.

As shown in a fragmentary enlarged view of FIG. 2, the bulge portion 32 provided on the bottom surface 30a bites in the inner circumferential end surface of the collar portion 36 (the fit-in portion 42) while plastically deforming the inner circumferential end surface thereof at swaging operation accordingly to form a sunken portion 44 in the inner circumferential end surface of the fit-in portion 42. The extending portion 28 (the force-fitted portion 46) is sandwiched or compressively sandwiched by and between the sunken portion 44 and the bulge portion 32 in a direction perpendicular to an axis.

Here, front and rear corner portions of an inner circumferential end of the collar portion 36 take shapes of circular arcs of radius R (here, R=0.7 mm), before swaging operation.

In the fragmentary enlarged view of FIG. 2, reference numeral 48 indicates an opening corner portion of the fit-in groove 30.

In this embodiment, the socket fitting 34 is provided integrally with holddown portions 40 projecting radially inwardly, between the swaged portions $P_2$ and $P_3$, and between the swaged portions $P_3$ and $P_4$, respectively, on an inner circumferential surface thereof.

In FIG. 2, reference character $d_5$ indicates a distance between the swaged positions $P_2$ and $P_3$ and a distance between the swaged positions $P_3$ and $P_4$, reference character $d_6$ indicates an axial length of the holddown portion 40, and $d_7$ indicates a length of the holddown portion 40 in a direction perpendicular to an axis.

In this embodiment, $d_5$ is 8 mm, $d_6$ is 3 mm and $d_7$ is 0.5 mm.

A swaging rate of the socket fitting 34 is 35%.

FIG. 3 shows a state before the insert pipe 29 is inserted in the straight-walled portion 26 of the corrugated metal tube 14. Meanwhile, in FIG. 3, the insert pipe 29 is inserted in the straight-walled portion 26 after the socket fitting 34 is fitted or disposed on the end portion of the hose body 12. However, the socket fitting 34 may be fitted or disposed on the end portion of the hose body 12 after the insert pipe 29 is inserted in the straight-walled portion 26.

In this state, the insert pipe 29 has an outer diameter $d_8$ that is greater than an inner diameter $d_9$ of the straight-walled portion 26. There is a dimensional difference (d) between the inner diameter $d_9$ of the straight-walled portion 26 and the outer diameter $d_8$ of the insert pipe 29.

In this embodiment, the insert pipe 29 with the outer diameter $d_8$ that is greater than the inner diameter $d_9$ of the straight-walled portion 26 is press-fitted in the straight-walled portion 26 by plastically deforming the straight-walled portion 26 in a diametrically expanding direction, and then the socket fitting 34 is swaged onto the hose body 12 in the radially inward direction, and thereby the hose body 12, the socket fitting 34 and the insert pipe 29 are totally assembled in to the hose 10.

In this embodiment, $d_9$ is 8.15 mm, $d_8$ is 8.35 mm, and the dimensional difference (d) is 0.2 mm.

According to this embodiment as stated above, the inner circumferential surface of the straight-walled portion 26 closely contacts with the outer circumferential surface of the insert pipe 29 firmly without clearance.

Thanks to this configuration, when an internal pressure is exerted to the hose 10, the internal fluid does not penetrate between the inner circumferential surface of the straight-walled portion 26 and the outer circumferential surface of the insert pipe 29. Therefore, it can be prevented that metal fatigue is caused in a specific region of the straight-walled portion 26 by bearing repeated cycling of internal pressure associated with penetration of the internal fluid resulting in an axial fracture in the region, and a durable life of the hose 10 can be improved.

In this embodiment, the socket fitting 34 is swaged at a plurality of the swaged positions in an axial direction thereof to define a plurality of the stepped portions axially spaced from each other, and the holddown portion 40 is formed on the inner circumferential surface of the socket fitting 34 between adjacent swaged positions so as to project radially inwardly for holding down the outer circumferential surface of the hose body 12 radially inwardly. With this configuration, the outer rubber layer 22 of the hose body 12 is prevented from being deformed so as to penetrate in a concave (refer to reference numeral 38) defined in an inner side of the socket fitting 34 between adjacent swaged positions thereof during swaging operation.

As a result, a certain region of the straight-walled portion 26, specifically a region between adjacent swaged positions is restrained from being swollen and deformed radially outwardly in a wavy manner. Accordingly, it can be prevented that fatigue fracture is caused in the swollen and deformed region by repeated cycling of internal pressure exerted to the region, and the durable life of the hose 10 can be further improved.

In this embodiment stated above, it can be favorably prevented that a large distortion or elongation is caused locally on the straight-wall portion 26, at a position of the opening corner portion 48 of the rear side surface 30c of the fit-in groove 30 resulting in a fracture in this region of the straight-wall portion 26.

Thereby pressure resistance of the composite hose with the corrugated metal tube 10 can be enhanced.

EXAMPLE

Figure 5:
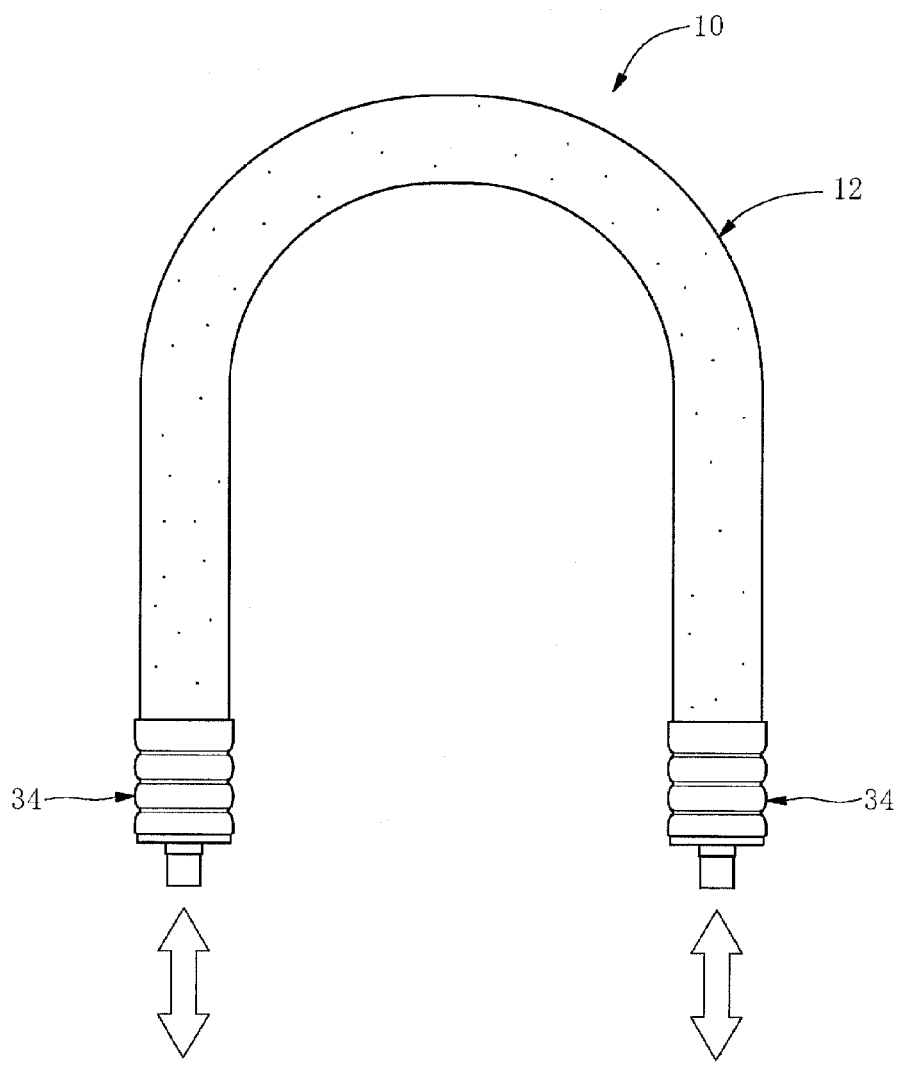
FIG. 5 is a view showing a bent shape of a hose for a durability test.

Examples and a comparison example of composite hoses with corrugated metal tubes are produced as shown in Table 1, and a durability test is conducted for each of the comparison example and the examples. In the durability test, each of the comparison example and the examples is bent into a U-shape as shown in FIG. 5, and an internal pressure is exerted to each of them repeatedly under the following conditions. Test results are shown in Table 1.

| <Conditions of the durability test> | |
|---|---|
| Bend R (radius): | 70 mm |
| Temperature: | 130° C. |
| Pressure: | 0<-->22.5 Mpa |
| Frequency (pressure cycle repetitions/minute): | 30 cpm |

TABLE 1

| | | Comparison Example | Example 1 | Example 2 |
|---|---|---|---|---|
| SUS corrugated metal tube | Material | SUS 304 | SUS 304 | SUS 304 |
| | Inner diameter × outer diameter (mm) | 4.5 × 9.7 | 4.5 × 9.7 | 4.5 × 9.7 |
| | Corrugation pitch (mm) | 2 | 2 | 2 |
| | Wall thickness (mm) | 0.23 | 0.23 | 0.23 |
| Inner diameter of straight-walled portion (mm) | | 8.14 | 8.14 | 8.14 |
| Rubber filler layer | | Silicon rubber | Silicon rubber | Silicon rubber |
| Hard resin layer | | PA6/EPDM alloy | PA6/EPDM alloy | PA6/EPDM alloy |
| Reinforcing layer 1 | | Braided aramid yarn | Braided aramid yarn | Braided aramid yarn |
| Outer surface rubber layer | | EPDM | EPDM | EPDM |
| Insert fitting | Outer diameter B (mm) | 8.15 | 8.35 (outer diameter of insert fitting is increased) | 8.35 (outer diameter of insert fitting is increased) |
| Socket fitting | Holddown portion on an inner side of socket fitting | Not provided | Provided | Not provided |
| Number of pressure cycle repetitions (ten thousand repetitions) | | 3.0, 3.5 Axial fracture on straight | 12.0 n = 2 No fracture failure | 12.0 n = 2 No fracture failure |

TABLE 1-continued

|  | Comparison Example | Example 1 | Example 2 |
|---|---|---|---|
| walled portion of SUS corrugate tube | | | |

Example 1 includes the socket fitting 34 that is provided with the above holddown portion 40 on an inner circumferential surface thereof, while Example 2 includes a socket fitting that is not provided with the holddown portion 40.

Comparison Example includes an insert pipe having an outer diameter of 8.15 mm generally equal to an inner diameter of a straight-wall portion of a corrugated metal tube and a socket fitting that is not provided with the holddown portion 40.

As appreciated from the results in Table 1, while no fracture failure is caused in Examples 1 and 2 even after more than one hundred thousand repetitions as a target value, a fracture failure is caused in Comparison Example after about thirty thousand repetitions, and a durability is improved in the embodiment of the present invention.

In the above examples and comparison example, the socket fittings are swaged at a plurality of swaged positions in an axial direction thereof. However, the socket fitting 34 may be swaged at exactly one swaged position so as to be diametrically contracted inwardly continuously through a certain axial length thereof and define a swaged portion of the certain axial length that is contracted radially inwardly, as shown in FIG. 6.

Figure 6A:
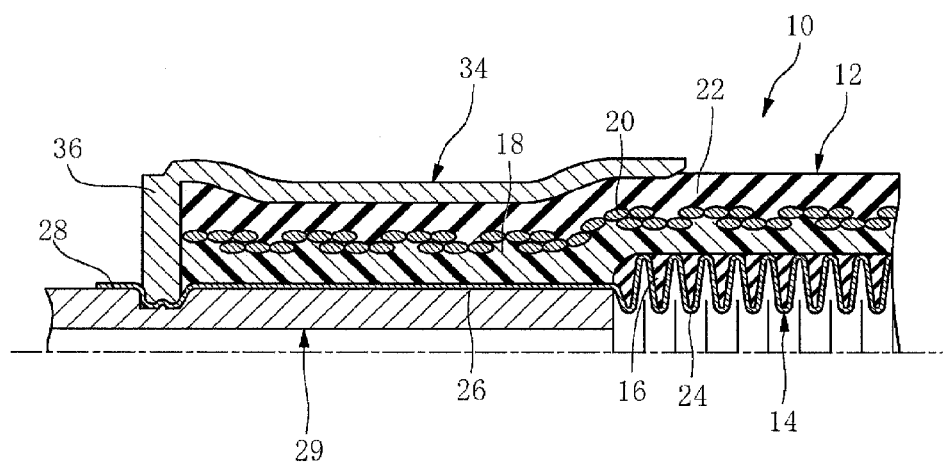
FIG. 6A is a sectional view of another composite hose with a corrugated metal tube, taken in an axial direction.
Figure 6B:
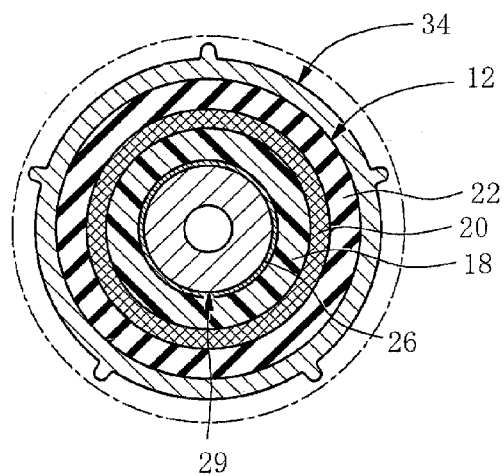
FIG. 6B is a sectional view of another composite hose with the corrugated metal tube, taken in a radial direction.
Figure 7:
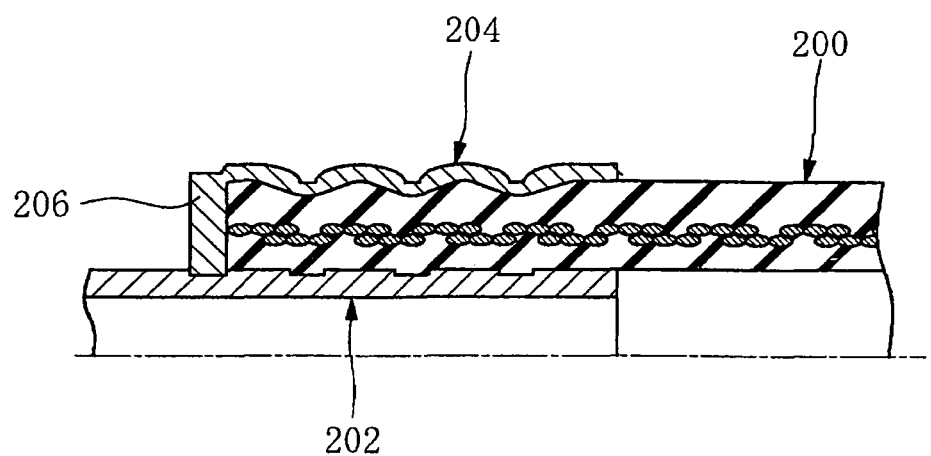
FIG. 7 is a sectional view of a conventional fastening structure of an end portion of a hose.
Figure 8A:
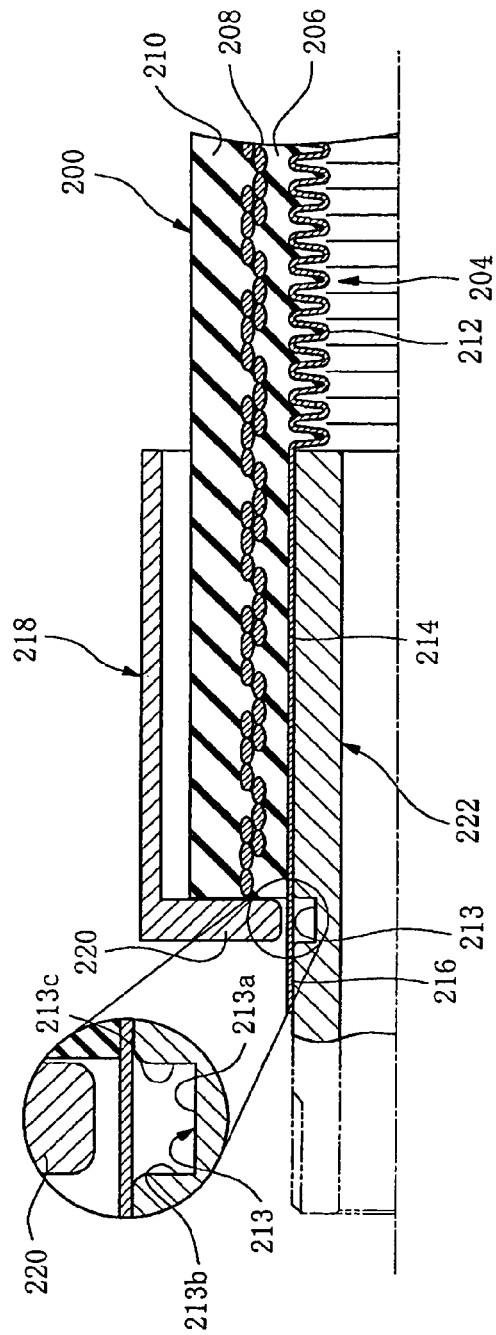
FIG. 8A is a sectional view showing a conventional composite hose with a corrugated metal tube before swaging operation.
Figure 8B:
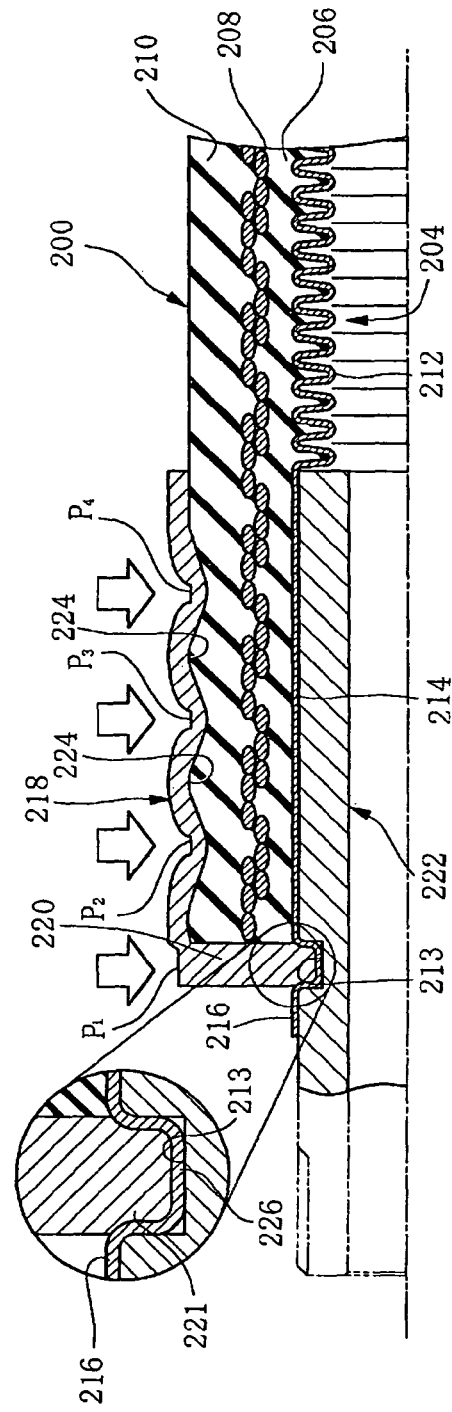
FIG. 8B is a sectional view showing the conventional composite hose with the corrugated metal tube after swaging operation.
Figure 9A:
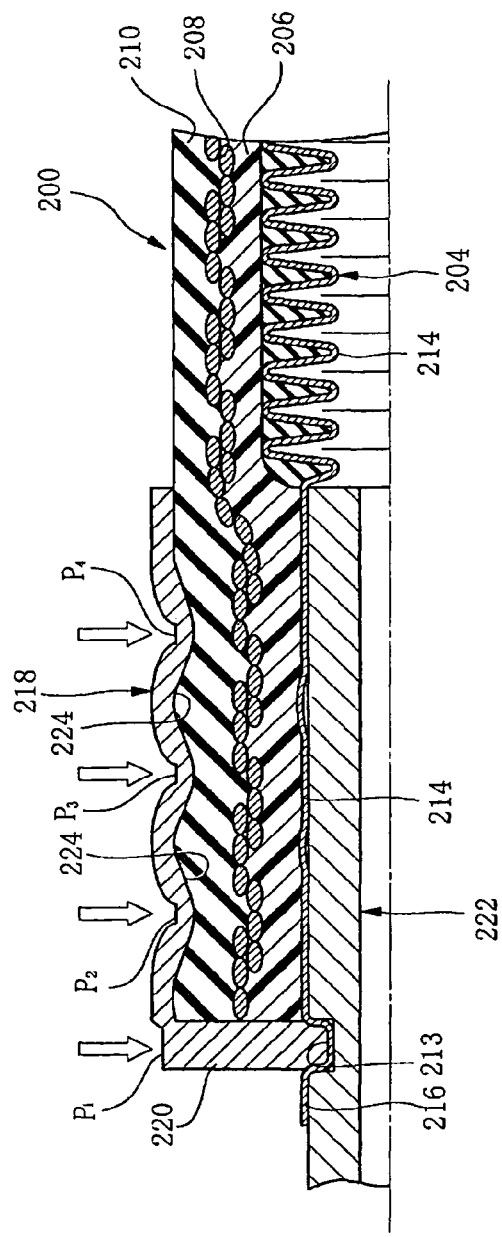
FIG. 9A is an explanatory view of a failure of the composite hose with the corrugated metal tube of FIG. 8.
Figure 9B:
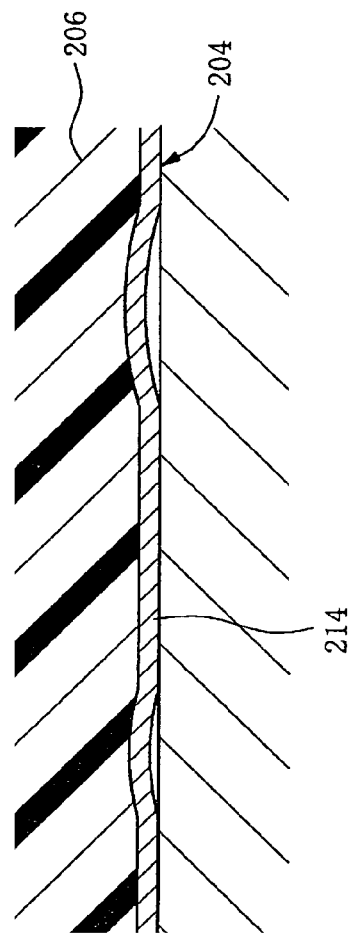
FIG. 9B is an enlarged view of a relevant part of FIG. 9A.
Figure 10:
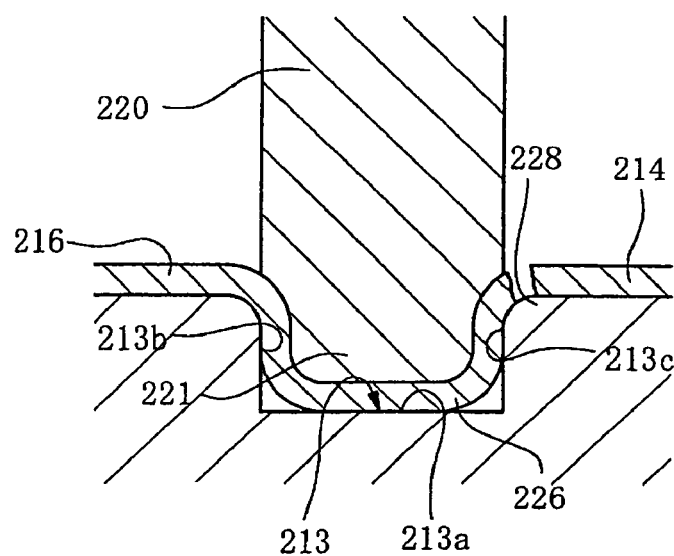
FIG. 10 is an explanatory view of another failure of the composite hose with the corrugated metal tube of FIG. 8.

In FIG. 6(B), an alternate long and short dash line indicates a shape before swaging operation, and a solid line indicates a shape after swaging operation.

When the socket fitting 34 is swaged not at the plurality of the swaged positions in the stepped manner but at the exactly one swaged position to define the swaged portion of the certain axial length in the flat manner as in FIG. 6, it can be prevented that a specific region of the straight-wall portion 26 of the corrugated metal tube 14 is swollen and deformed during swaging operation of the socket fitting 34, and a durable life of the hose 10 can be effectively improved.

As shown in Table 2, composite hoses with corrugated metal tubes No. 1, No. 2 and No. 3 are produced. These composite hoses include insert pipes of an inner diameter A, 6.4 mm and of an outer diameter B, 8.35 mm. The insert pipes are formed with fit-in grooves with bottom surfaces of an axial length $d_1$ 3.2 mm and rear side walls inclined at varied taper angles θ, respectively, as shown in Table 2. An internal pressure of 12 MPa is applied in each of the composite hoses at a temperature of 120° C., and leakage of an internal fluid is checked. The results are shown in Table 2.

TABLE 2

|  | Inner diameter A (mm) | Outer diameter B (mm) | Axial length of bottom surface $d_1$ (mm) | Taper angle θ (°) | Taper length (mm) | Evaluation of permeation of internal fluid ($CO_2$) 120° C. × 12 MPa |
|---|---|---|---|---|---|---|
| No. 1 | 6.4 ± 0.02 | 8.35 + 0.05/−0 | 3.2 ± 0.1 | 0 | 0.98 | Leakage due to fracture of SUS tube at position of a corner portion |
| No. 2 | 6.4 ± 0.02 | 8.35 ± 0.05/−0 | 3.2 ± 0.1 | 45 | 1.38 | Slight leakage |
| No. 3 | 6.4 ± 0.02 | 8.35 ± 0.05/−0 | 3.2 ± 0.1 | 60 | 1.95 | No leakage |

In the composite hose No. 1, an internal fluid leaked due to fracture on a portion of a straight-wall portion of a corrugated metal tube at a position of a corner portion of a fit-in groove.

On the other hand, in the composite hose No. 2 including a fit-in groove having a tapered rear side surface or wall inclined at an angle θ 45°, a leakage failure is improved compared to the composite hose No. 1 but an internal fluid slightly leaked.

On the contrary, in the composite hose No. 3 including a fit-in groove 30 having a tapered rear side surface or wall 30c inclined at an angle θ of 60°, an internal fluid did not leak even when an internal pressure is applied constantly for 72 hours.

Meanwhile, a taper length of each of the composite hoses No. 1, No. 2 and No. 3 is as shown in Table 2.

As appreciated from the results of Table 2, by inclining or tapering the rear side surface or wall, a leakage failure is improved. And a taper angle of the rear side wall 30c equal to or higher than 60° will bring about better result in terms of a leakage failure.

Although the preferred embodiments have been described above, these are only some of embodiments of the present invention. The present invention can be embodied by a variety of modifications without departing from the scope of the invention.

What is claimed is:

1. A composite hose with a corrugated metal tube, comprising:
    a hose body having a corrugated metal tube as an inner layer and an outer layer including an elastic layer laminated on an outer side of the corrugated metal tube, the corrugated metal tube including a non-corrugated straight-walled portion extending straight in an axial direction thereof on an end portion thereof, an end part of the straight-walled portion extending axially outward from the outer layer to define an extending portion,
    a rigid insert pipe inserted in the straight-walled portion, a socket fitting of a sleeve shape fitted on the hose body by being swaged thereon radially inwardly, the socket fitting including a radially inwardly directed collar portion, an inner circumferential end or an inner circumferential end portion of the collar portion and an outer circumferential surface of the insert pipe compressing the extending portion of the straight-walled portion to fix the straight-walled portion onto the insert pipe and provide a seal between the outer circumferential surface of the insert pipe and an inner circumferential surface of the straight-walled portion, wherein:

a fracture preventing mechanism is provided on a hose end portion for preventing fracture of the straight-walled portion.

2. The composite hose with the corrugated metal tube as set forth in claim 1, wherein the fracture preventing mechanism is constructed in a manner such that an outer diameter of the insert pipe is set greater than an inner diameter of the straight-walled portion before insertion of the insert pipe by 0.1 mm or more, and the insert pipe is press-fitted in the straight-walled portion by plastically deforming the straight-walled portion in a diametrically expanding direction.

3. The composite hose with the corrugated metal tube as set forth in claim 1, wherein an annular fit-in groove is formed in the outer circumferential surface of the insert pipe, the inner circumferential end or the inner circumferential end portion of the collar portion of the socket fitting is fitted in the fit-in groove by plastically deforming the extending portion and force-fitting the extending portion into the fit-in groove, the collar portion and the fit-in groove compress a force-fitted portion of the extending portion of the straight-walled portion therebetween to fix the straight-walled portion onto the insert pipe and to provide a seal between the outer circumferential surface of the insert pipe and the inner circumferential surface of the straight-walled portion, the fracture preventing mechanism is constructed in a manner such that a rear side wall of the fit-in groove near the hose body or the outer layer is angled away from an axially inner surface of the collar portion on a rear side thereof as approaching from a bottom surface of the fit-in groove to an opening thereof, the bottom surface of the fit-in groove and a front side wall of the fit-in groove opposite to the hose body or the outer layer, and an inner circumferential end surface of the collar portion and axially outer surface of the collar portion on a front side thereof corresponding to the bottom surface and the front side wall of the fit-in groove compress the force-fitted portion therebetween, while the rear side wall of the fit-in groove near the hose body or the outer layer and an axially inner surface of the collar portion on a rear side thereof, corresponding to the rear side wall of the fit-in groove, does not compress the force-fitted portion of the extending portion therebetween.

4. The composite hose with the corrugated metal tube as set forth in claim 2 or 3, wherein the socket fitting is swaged at a plurality of swaged positions in an axial direction thereof to define a plurality of stepped portions axially spaced from each other, and a holddown portion is formed on an inner circumferential surface of the socket fitting between adjacent swaged positions so as to project radially inwardly for holding down an outer circumferential surface of the hose body radially inwardly.

5. The composite hose with the corrugated metal tube as set forth in claim 2, wherein the socket fitting is swaged so as to be diametrically contracted inwardly continuously through a certain axial length thereof and define a swaged portion of the certain axial length that is contracted radially inwardly.

6. The composite hose with the corrugated metal tube as set forth in claim 3, the rear side wall of the fit-in groove defines a tapered surface inclined or angled at a taper angle of 60° to 70°.

7. The composite hose with the corrugated metal tube as set forth in claim 6, wherein a taper length of the rear side wall defining the tapered surface is 1.5 mm to 3.0 mm.

* * * * *